US008667981B2

(12) United States Patent
Termansen

(10) Patent No.: US 8,667,981 B2
(45) Date of Patent: Mar. 11, 2014

(54) METHOD OF MANUFACTURING A LIQUID DISCHARGE HEAD

(75) Inventor: Jens Termansen, Yorkshire (GB)

(73) Assignee: Krones AG, Neutraubling (DE)

( * ) Notice: Subject to any disclaimer, the term of this patent is extended or adjusted under 35 U.S.C. 154(b) by 842 days.

(21) Appl. No.: 12/669,995

(22) PCT Filed: Jul. 16, 2008

(86) PCT No.: PCT/GB2008/050576
§ 371 (c)(1),
(2), (4) Date: May 25, 2010

(87) PCT Pub. No.: WO2009/013523
PCT Pub. Date: Jan. 29, 2009

(65) Prior Publication Data

US 2010/0313959 A1 Dec. 16, 2010

(30) Foreign Application Priority Data

Jul. 24, 2007 (GB) .................................. 0714427.2

(51) Int. Cl.
*B08B 3/04* (2006.01)
*B01F 5/04* (2006.01)
*F16K 11/044* (2006.01)
*F16K 11/083* (2006.01)

(52) U.S. Cl.
USPC ..... 137/15.06; 137/239; 137/240; 137/625.5; 137/897

(58) Field of Classification Search
USPC ............... 137/625.4, 625.42, 625.48, 625.49, 137/625.5, 602, 605, 606, 896, 897, 239, 137/240, 15.01, 15.04, 15.05, 15.06
See application file for complete search history.

(56) References Cited

U.S. PATENT DOCUMENTS

| | | | | | |
|---|---|---|---|---|---|
| 368,266 | A | * | 8/1887 | Wright | 239/416 |
| 371,157 | A | * | 10/1887 | Wright | 239/416 |
| 4,458,543 | A | * | 7/1984 | Mieth | 73/863.86 |
| 4,564,242 | A | | 1/1986 | Krude et al. | |
| 5,101,858 | A | * | 4/1992 | Klotz | 137/605 |
| 5,772,285 | A | | 6/1998 | Bigley et al. | |
| 5,788,127 | A | * | 8/1998 | Hanmer | 222/422 |
| 5,862,996 | A | * | 1/1999 | Crichton | 239/583 |
| 5,975,163 | A | * | 11/1999 | Gianfranco | 141/313 |
| 5,992,455 | A | | 11/1999 | Koller et al. | |
| 6,375,050 | B1 | * | 4/2002 | Gruson | 222/504 |
| 6,446,680 | B1 | | 9/2002 | Soehnlen et al. | |
| 6,546,970 | B2 | * | 4/2003 | Gatteschi | 141/106 |
| 6,772,806 | B2 | | 8/2004 | De Villele | |
| 7,565,917 | B2 | * | 7/2009 | Kamiya et al. | 137/614.04 |

FOREIGN PATENT DOCUMENTS

| | | | |
|---|---|---|---|
| DE | 3025757 | | 2/1982 |
| DE | 3239802 | A1 | 5/1984 |
| EP | 1207108 | A1 | 5/2002 |
| GB | 2308174 | A | 6/1997 |
| GB | 2429262 | A | 2/2007 |

(Continued)

*Primary Examiner* — Craig Schneider
*Assistant Examiner* — Jonathan Waddy
(74) *Attorney, Agent, or Firm* — Marshall, Gerstein & Borun LLP; Michael P. Furmanek

(57) ABSTRACT

An outer valve surrounds an inner valve. A plug can move relative to a seat of the inner valve to control flow through that valve. A plug co-operates with the outlet port of the outer valve to control fluid through that valve. The plug comprises part of the inner valve.

2 Claims, 2 Drawing Sheets

(56) References Cited

FOREIGN PATENT DOCUMENTS

| | | | |
|---|---|---|---|
| WO | WO-98/30490 | A1 | 7/1998 |
| WO | WO-0140098 | A1 | 6/2001 |
| WO | WO-2006045165 | A1 | 5/2006 |
| WO | WO-2006091159 | A1 | 8/2006 |

* cited by examiner

METHOD OF MANUFACTURING A LIQUID DISCHARGE HEAD

CROSS-REFERENCE TO RELATED APPLICATION

The present application claims the benefit of priority of International Patent Application No. PCT/GB2008/050576, filed Jul. 16, 2008, which application claims priority of United Kingdom Application No. 0714427.2, filed Jul. 24, 2007. The entire text of the priority application is incorporated herein by reference in its entirety.

FIELD OF THE DISCLOSURE

The present disclosure relates in general to a fluid control arrangement and to a method of controlling fluid.

BACKGROUND

Many industries can benefit from mixing different components into a final packaging, for example by mixing a concentrate with a diluted element to achieve a mixture meeting the specification of the final saleable product.

U.S. Pat. No. 5,992,455 Koller discloses a dual stream filling system having a secondary filling tube, fitted with a valve, positioned partly within a primary filling tube. It is clear that a relatively complicated valve closing mechanism needs to be located inside the secondary filling tube. A problem with this apparatus is that hygiene and operation are relatively complex. Another problem is that the apparatus mixes two components inside a nozzle, specifically the secondary filling tube, thus making it impossible to make accurate mid-flow instant changes to the proportions of fluids dispensed.

U.S. Pat. No. 6,772,806 De Villele discloses an apparatus for filling receptacles with two different components, comprising a single carousel providing an inner and outer orbit for the receptacles. A receptacle is initially transported around one orbit of the carousel and filled or partially filled upon arrival at a first of two filling stations, where a nozzle dispenses a weighed amount of one of two components. After passing through the first filling station the receptacle is displaced into the other orbit. The receptacle is then filled upon arrival at a second filling station, where a nozzle dispenses a weighed amount of the second of the two components. A problem with this system is that, as with the Soehnlen apparatus, machines are not utilized to their full filling capacity. Another problem is that the mechanism for transferring receptacles between inner and outer orbits is complex and suffers from increased chances of receptacle breakages.

In one method shown in U.S. Pat. No. 6,446,680 empty milk containers proceed through two filling carousels arranged in series. The first carousel can deliver skimmed milk to the containers on the carousel and the second carousel can deliver full fat milk. The machines are both large and complex. Further, the machines are not utilized to full capacity when containers designated for whole milk only must remain empty as they pass through the skimmed milk carousel.

WO/2006/091159 discloses a method of filling a toothpaste container with two different colored paste such that a lasting pattern is formed. Concentric inner and outer ducts dispense the paste from the filling nozzle with the outlet from each duct having a valve. Mixing of the different colors is to be avoided.

GB 2429262 discloses a shut-off valve assembly for controlling exhaust gas flow of an internal combustion engine. A main valve and an auxiliary valve are provided.

GB 2308174 discloses a single chemical dispenser with a tapered outlet passage leading to an outlet orifice at the bottom end. A drip piston and a dribble piston are also provided. The outlet orifice cannot be opened without the dribble and drip pistons also allowing flow of the single chemical.

SUMMARY OF THE DISCLOSURE

It is an object of the present disclosure to provide a fluid control arrangement that solves at least one of the problems of the prior art.

According to a first aspect of the present disclosure there is provided a fluid control arrangement.

According to a second aspect of the present disclosure there is provided a method of dispensing fluids.

According to one aspect of the present disclosure a fluid control arrangement includes a first valve having an outlet and a first restrictor in which, in use, relative movement between the restrictor and the outlet is arranged to control the flow of a first fluid through the outlet to the first valve; and a second valve having an outlet and a second restrictor in which, in use, relative movement between the restrictor and the outlet is arranged to control the flow of a second fluid through the outlet of the second valve; at least part of the first valve being arranged within the second valve; the second restrictor comprising part of the first valve the first valve has a cavity, upstream of the outlet of the first valve, into which first fluid is arranged to be supplied and in which the second valve has a cavity upstream of the outlet of the second valve into which the second fluid is arranged to be supplied which cavity is sealed from the cavity of the first valve upstream of outlets of the first and second valves and wherein a closure member is provided arranged to seal the outlets of the first and second valves such that, when the valves allow fluid to flow, the outlets are in fluid communication with each other whereby, in use, fluid is arranged to flow from the cavity of a first one of the first or second valve out of its outlet towards the outlet of the cavity of a second one of the first or second valve and into the cavity of the second one of the first or second valve through the outlet of the cavity of the second one of the first or second valve with fluid between the cavity of the first valve and the cavity of the second valve being contained by the closure member.

The first and second restrictors may be independently movable.

The relative movement of at least one of the restrictors and its associated outlet may be arranged to be linear and the relative movement of the first and second restrictors and their associated outlets may be linear and the movement of the first and second restrictors and their associated outlets may be in the same direction.

Fluid of the first valve may be arranged to flow past one side of the second restrictor with fluid of the second valve being arranged to flow past the other surface of the second restrictor.

The first restrictor and the outlet of the first valve may be arranged to be movable together relative to the outlet of the second valve in a plurality of different relative positions of the first restrictor and the outlet of the first valve.

The second restrictor may also comprise the outlet of the first valve.

At least one of the restrictors may be tapered in the direction of relative movement occurring during the first fluid control.

At least one of the outlets may be tapered in the direction of relative movement.

At least one of the restrictors may be arranged to extend through its associated outlet when controlling that fluid.

At least one of the outlets may be arranged to be closed when fluid of that valve is controlled.

At least one of the valves may have a fluid flow meter.

Control means may be provided arranged to close the outlet of at least one valve when a predetermined amount of fluid has flowed through that valve.

Biasing means may be arranged to urge the outlet and the restrictor of at least one valve in at least one direction of relative movement.

At least one of the valves may include power means arranged to cause relative movement of the restrictor and it associated outlet.

Only one of the first restrictor outlets of the first valve or the second restrictor or outlet of the second valve may not move during relative movement in order to restrict the first or second valves. The outlet of the second valve may extend around the first valve. At least one of the outlets may be circular at its outer periphery when viewed in the direction of relative movement of that valve. At least one of the outlets, when opened, may be circular at its inner periphery when viewed in the direction of relative movement of that valve.

The arrangement may include a third valve having an outlet and a third restrictor, at least part of the first or second valves being arranged within the third valve, the third restrictor being part of the second valve. Any features of the first or second valves may also apply to the second and third valves.

The present disclosure also includes a container arranged to be supplied with fluid from at least one of the valves. The container may be arranged to be supplied with fluid from both valves. Fluid from one valve may be supplied part of fluid from the other fluid being supplied or fluid from both valves may be able to be provided simultaneously. The fluid may be arranged to be mixed before the fluid hits the bottom of the container or fluid in the container. The container may be arranged to remain stationery relative to both valves when, in use, the container is being filled from either or both valves. The arrangement may include weigh means arranged, in use, to control the amount of fluid being supplied from at least one of the valves.

According to another aspect of the present disclosure a method of controlling fluid with a first valve and a second valve, in which the first valve has an outlet to the first restrictor and the second valve has an outlet to second restrictor with part of the first valve being arranged in the second valve, the method comprises: controlling the flow of a first fluid through the outlet of the first valve by causing relative movement between the first restrictor and the outlet of the first valve, and controlling the flow of a second fluid through the outlet of the second valve by causing relative movement of the second restrictor and the outlet of the second valve with relative movement of the second restrictor being caused by moving part of the first valve which comprises the second restrictor.

The method may comprise causing fluid to flow out of one valve and then stopping that flow and then causing fluid to flow out of the other valve. The method may comprise causing fluid from each valve to enter a common container. The method may comprise maintaining the valves and the container stationery relative each other when filling from either or both valves.

The method may comprise causing fluid to flow from the second valve to flow around the complete periphery of the fluid flow path from the outlet of the first valve.

The method may comprise causing fluid to flow into the container and maintaining the fluid flow rate of at least one of the valves and causing that fluid flow to stop when the desired quantity of fluid has entered the container from the valve.

The method may comprise weighing a container into which fluid is flowing from at least one of the valves and stopping that flow when the desired weight has entered the container. The fluid from at least one valve may comprise any one of a liquid, milk, mixtures, powder or granules.

The method may comprise causing fluid to flow from the second valve to be directed at an angle to the vertical at least the second valve. The method may comprise causing fluid that has left the second valve to be inclined at an angle to the vertical. The method may comprise increasing the angle to the vertical of fluid flowing from the second valve after the fluid has left the second valve at an angle to the vertical.

The present disclosure includes a method of controlling fluid when using a fluid control arrangement as herein referred to.

BRIEF DESCRIPTION OF THE DRAWINGS

For a better understanding of the present disclosure, and exemplary embodiments of the same, reference will now be made, by way of example, to the accompanying drawings, wherein.

DETAILED DESCRIPTION OF THE PREFERRED EMBODIMENT

Figures 1, 2, 3, 4:
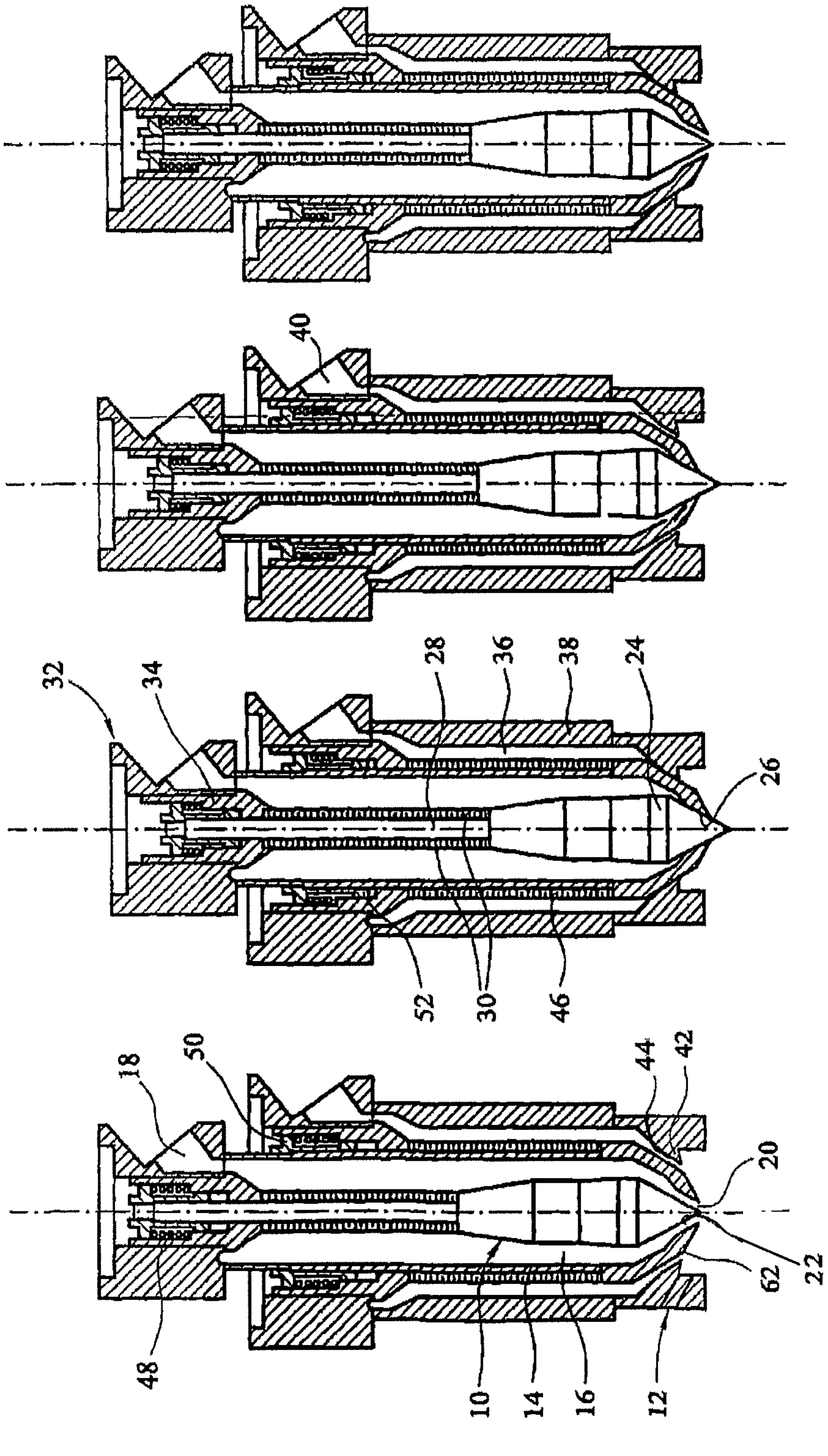
FIG. 1 is a cross-section of a fluid control arrangement in accordance with an exemplary embodiment of the present disclosure, wherein an inner valve is in an open position and an outer valve is in an open position.
FIG. 2 shows the inner valve in a closed position and the outer valve in a closed position.
FIG. 3 has the inner valve in a closed position and the outer valve in an open position.
FIG. 4 shows the inner valve in an open position and the outer valve in a closed position.

The exemplary fluid control arrangement permits the controlled flow and possible subsequent mixing of at least two fluids. The arrangement provides an inner valve 10 which controls the flow of a first fluid and an outer valve 12 which controls the flow of a second fluid. The inner valve 10 is located within and serves as a valve plug to the outer valve.

A cylindrical body 14 defines an inner valve chamber 16. The body 14 has a fluid inlet port 18 and an outlet port 20. Each port is in fluid communication with the chamber 16. The body 14 ends in a conically tapered valve seat 22 towards the outlet port 20.

Mounted within the inner valve 10 is a valve plug 24 having a conical taper 26 at its lower end to complement the valve seat 22 so that the plug 24 can sit in the seat 22 to block the outlet port 20 as shown in FIGS. 2 and 3, or to be clear of that seat in an open position as shown in FIGS. 1 and 4.

As the plug 24 moves, a valve stem 28 of the plug moves through a bellows 30, connected to ahead 32. The bellows ensure that the inner valve chamber 16 remains enclosed and that any fluid present in the chamber is separate from bearings 34 within the head 32 that guide the stem 28.

The outer valve comprises an outer valve chamber 36 the outside of which is defined by a cylindrical body 38.

The body 38 has an inlet port 40 and an outlet port 42. Each port is in fluid communication with the outer valve chamber 36. The body 38 ends in a conically tapered valve seat 44 towards the outlet port 42.

The inner cylindrical body 14 serves as a plug to the outer valve 12.

The body 14 that serves as the outer plug and the inner plug 24 are separately moveable along the longitudinal axis enabling either valve to be selectively opened or closed. The outer valve body 38, in this embodiment is fixed.

The body 14 moves through a bellows 46, which ensures that the bearings 48 and other moving parts between the bodies 14 and 38 are separate from the second fluid.

Pneumatic pressure, for example, or other pressure is applied to the top of the inner valve stem 28 to urge the plug 24 into a closed position, against the action of a compression spring 48. Similarly, pneumatic or other pressure is applied to an upwardly facing surface 50 of the body 14, which surface is located below the head 32. This causes the body 14 to move downwardly against the action of a spring 52 to close the outer valve. Alternatively the spring (or springs) may act to bring the or each valve to the closed position with the applied force opening the valves.

The valves 10 and 12 provide a method of selectively dispensing whole, skimmed or semi-skimmed milk with full fat milk being supplied to the inner valve and skimmed milk to the outer valve. Semi-skimmed milk is formed from a mixture of the full fat milk and skimmed milk.

Both valves 10, 12 are connected to full fat or skimmed milk sources respectively.

Milk is then dispensed from either or both of the valves by opening the valves and allowing milk to flow from the inlet ports 18, 40, through the respective inner/outer outlet ports 20, 42 directly into a milk bottle or carton. The fluids only mix after they leave the valves. For semi skimmed milk both valves are opened, either simultaneously or in sequence.

As shown in FIG. 1, the milk leaving the outer valve flows over the exterior surface of the body 14. After the milk leaves the seat 44, the milk continues to flow over and stay within the body 14 as a result of the steep angle to the vertical of that body. In addition, the outer surface of the body 14 includes an arcuate portion 62 extending downwardly towards the outlet of the inner valve. Again the milk clings to the exterior of the body 14 over that arcuate surface and beyond as a result of surface tension such that milk from the second valve may occupy a reduced diameter compared to the diameter of the outlet 42. Indeed, the milk from the second valve may flow downwards, beyond the body 14, over an area that includes at least part of the area defined by milk leaving the first valve outlet 20. In the case where fluid 'a' is less viscous than fluid 'b', then fluid 'a' may be dispensed through the outer valve to enhance the adhesive effect that allows this inwards direction of flow to occur.

The angle of the exterior of the body 14 in the region of the open outlet 42 may be less than 40° to the vertical or more than 10° to the vertical and is preferably 25° to the vertical. The angle of the exterior of the body 14 to the vertical at the location where milk leaves that body may be less than 80° to the vertical or more than 30° to the vertical and is preferably 70° to the vertical.

Similarly, milk leaving the inner valve flows over the outer surface of the downwardly tapering plug 24 and clings to that surface as a result of surface tension. Milk leaving the first valve may have a reduced diameter compared to the diameter of the first outlet.

The angle of the exterior of the plug 24 may be less than 40° to the vertical or may be more than 10° and is preferably 20 to the vertical.

From FIG. 1, where both valves are open, it can be seen that the height of the bottom of the plug 24 and the height of the bottom of the body 14 are the same. Consequently, the different milks mix immediately after they leave the arrangement. Thus there may be no need to later mix the different milks and the milks will be thoroughly mixed even before they start to fill a container.

The relative concentrations of whole and skimmed milk in the resulting semi-skimmed milk collected in the auxiliary container may be controlled through monitoring and adjusting the flow rate of each milk component. Flow meters may be employed to measure volumetric flow at each inlet.

Flow rates may be adjusted by either changing the pressure applied upstream from the inlet ports 18,40 or by adjusting the degree to which the valves are open or by closing the valves when the required volume has been dispensed. Flow metering may be finely controlled by a computer so that semi-skimmed milk can be accurately dispensed to meet a desired specification or particular regulatory standards. Flow metering may be adjusted mid-flow to make accurate instant changes to % fat content dispensed. Adjustment of the flow metering allows the same total volume of milk to be dispensed from each valve when separately operated or from both valves when simultaneously operated.

Milk bottle handling is at one station as for any normal one component filling machine. A filling carousel may be employed with the flow metering referred to above. Alternatively, weigh cells may be included below each container to ascertain when a bottle has been sufficiently filled. The weigh cell may optionally be used to sequentially weigh out a desired amount of whole milk followed by a desired amount of skimmed milk.

Fluid control arrangements of the present disclosure will operate in any filler concept, whether linear, as with a conveyer system, or rotary, as with a carousel system.

Figure 5:
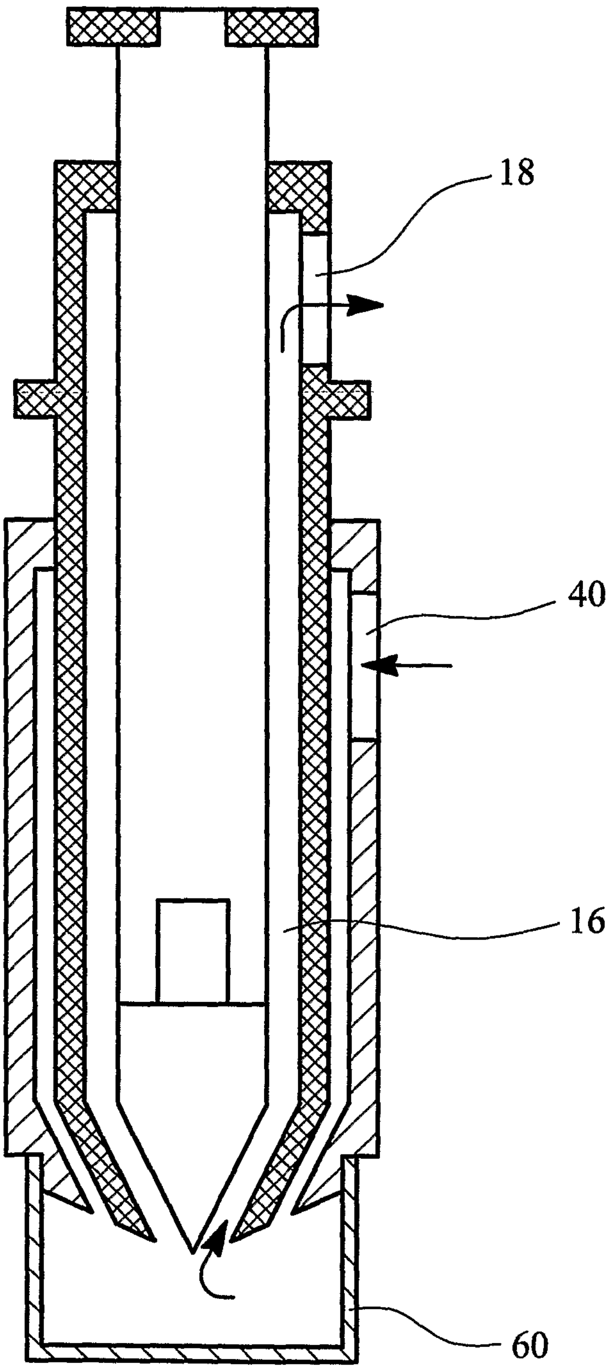
FIG. 5 is a schematic cross-section with both valves in an open position in a cleaning position.

The valve chambers 16, 36 may be easily cleansed by using the arrangement shown in FIG. 5. In that Figure, both valves are in the open position and a cap 60 extends around and seals with the exterior of the lower end of the outer valve body 38. During cleansing, water under pressure is supplied through the inlet 40 to the outer valve. This flushes down, out of the outer valve, within the cap 60 and then up the chamber 16 before leaving through the port 18. Liquid leaving the port 18 is monitored, for instance, by measuring the electrical resistance of the liquid. Thus milk leaving the port 18 can be recycled.

The valves may optionally have second inlet ports (not shown) which are themselves fitted with two-way valves to enable the ports to be open and closed. The second inlet ports may then be used to provide a return CIP (Clean In Process) flow during cleaning.

Fluid control arrangements of the present disclosure are compatible with a "metric/imperial bottle design" and may dispense milk upon reading the labels.

This principle could be extended to having as many valves located one inside each other as practically possible such as three or more valves each separately selectively operable. For example, the third valve could surround the valves shown with the plug for the third valve comprising the body 38, which body 38 may now be moveable and may then have a tapered lower end to fit into a conically tapered opening of the third valve.

In a further embodiment (not shown) a conduit is provided throughout the length of the stem 28 with an opening at the bottom tip of the stem. A fluid, for example syrup with flavor and/or coloring, may be dispensed through that conduit in a metered dose at any time when a container is located beneath the valves.

A first advantage of the described embodiments is that a less complex and more cost efficient apparatus and method for dispensing fluids is provided, particularly with regard to operations, factory layout, processes and product flows from raw material intake to the dispatch of finished products.

A second advantage is that two or more components of a product can be dispensed from separate chambers of the same valve system, either one at a time or all at the same time.

A third advantage of the present disclosure is that there is provided an apparatus and method for dispensing fluids with significant reductions in footprint, structure, processing, storage, filling and cold-store/warehousing.

A fourth advantage of the present disclosure is that nozzles and weigh cells are utilised to 100% capacity, since filling with multiple components can occur at one station.

A fifth advantage of the present disclosure is that cleaning of the fluid control arrangement is simple and does not require any additional cleaning pipes, channels or systems. The present disclosure furthermore provides a hygienic design with no moving mechanical parts inside the product flow area.

A sixth advantage of the present disclosure allows production to order, full flexibility, Just In Time order fulfilment, through accurate change of weight or volume, between two containers, of the liquid streams with no loss, inter phase or reduction of speed of filling.

A seventh advantage is that there is less or no waste of milk related to product change, purging or cleaning.

An eighth advantage is that there is a quick change over time as there is no need to drain a tank of skimmed milk, for instance, before replacing with full fat milk.

A ninth advantage is that there is a reduced capital expenditure as only two tanks of milk are required (i.e. not the whole, semi and skimmed tanks—but just the whole and skimmed milk).

A tenth advantage is that the products are able to be mixed immediately they leave the arrangement.

While the present disclosure has been described in relation to milk, other fluids or mixtures or powders or granules or gases or any combination thereof may be discharged through the two or more valves.

For example water and a concentrate may be mixed as spirits or wine and orange juice and lemonade. Further, a range of flavored products may be mixed through the different valves, such as by using the same base ingredient, for example. The valves may be used to mix at least one fluid for instance that may be liable to foaming and such dispending may be enhanced as a result of the smooth flow effected by the downwardly tapering surfaces of the plug or body.

If desired, the angles of the tapered surfaces of the plug 10 or body 14 may be altered to ensure that the angle is matched to the surface tension of a product being dispensed for example to optimize the ability of the product to cling to that surface and to assist in the discharge and possibly in the mixing of products as they leave the arrangement.

Although a few preferred embodiments have been shown and described, it will be appreciated by those skilled in the art that various changes and modifications might be made without departing from the scope of the disclosure, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method of controlling fluid with a first valve and a second valve, in which the first valve has an outlet and a first restrictor and the second valve has an outlet and a second restrictor with part of the first valve being arranged in the second valve, the method comprising:

controlling the flow of a first fluid downwardly through the outlet of the first valve by causing relative movement between the first restrictor and the outlet of the first valve, controlling the flow of a second, different fluid downwardly through the outlet of the second valve by causing relative movement of the second restrictor and the outlet of the second valve with relative movement of the second restrictor being caused by moving part of the first valve which comprises the second restrictor, and when each valve is caused to be open each restrictor of that valve is caused to present an exterior surface that tapers downwardly and inwardly, the method further comprising sealing the outlets of the first and second valves such that, when the valves allow fluid to flow the outlets are in fluid communication with each other and causing fluid to flow out of the outlet of a first one of the first or second valve and back through the outlet of a second one of the first or second valve in order to clean a cavity of the first valve and a cavity of the second valve.

2. A method according to claim 1 comprising causing the different fluids to mix as the fluids leave the restrictors.

* * * * *